Figures 1, 2:
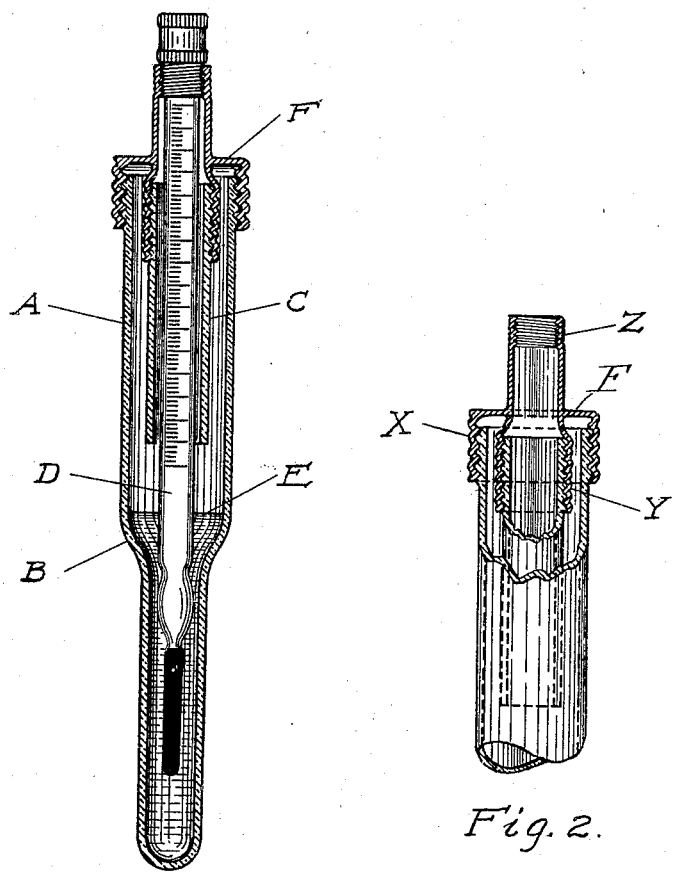

G. SAMARRA.
PHYSICIAN'S THERMOMETER STERILIZER.
APPLICATION FILED NOV. 11, 1915.

1,200,652. Patented Oct. 10, 1916.

UNITED STATES PATENT OFFICE.

GEORGE SAMARRA, OF TARENTUM, PENNSYLVANIA.

PHYSICIAN'S-THERMOMETER STERILIZER.

1,200,652.  Specification of Letters Patent.  Patented Oct. 10, 1916.

Application filed November 11, 1915. Serial No. 60,945.

*To all whom it may concern:*

Be it known that I, GEORGE SAMARRA, a citizen of the the United States, residing at Tarentum, in the county of Allegheny and State of Pennsylvania, have invented a certain new and useful Improvement in Physicians'-Thermometer Sterilizers, of which the following represents a specification.

The invention relates to the sterilizing of physicians' thermometers and has for its object the keeping of the thermometer free of germs and prepared for immediate use without further sterilizing. This object is accomplished by inserting a thermometer in an apparatus as set forth in the specifications herein and as shown in the drawings hereto attached, in such a manner that it extends down into the sterilizing substance contained in the apparatus. I attained this object by means of the apparatus illustrated in the accompanying drawings, Figure 1 of which is a vertical section of the entire apparatus and Fig. 2 a metal cap or top-piece.

In Fig. 1, A is a tube of glass or metal (preferably glass) about $\frac{1}{2}$ inch in diameter at the top, about $\frac{3}{4}$ inches in diameter at the bottom and about $4\frac{1}{2}$ inches in length. This tube is reduced in diameter from $\frac{1}{2}$ to $\frac{3}{4}$ inches at B which is about $1\frac{7}{8}$ inches from the top of the tube. C is another glass or metal tube about $\frac{1}{4}$ inch in diameter and about $1\frac{3}{4}$ inches in length, with both ends open. The tube A has threads on the outside at the upper end and the tube C has threads on the outside at the upper end. D is an ordinary physician's thermometer with threads on the outside of the metal top piece of same. E is the sterilizing substance such as alcohol or some other good sterilizer. F is a metal top piece for said apparatus as shown in Fig. 2.

In Fig. 2, X is a metal cap about $\frac{1}{4}$ inch in diameter on the inside, about $\frac{3}{4}$ inches in length with threads on the inside. Y is another part of the same cap extending down an equal distance and inside of X. Z is another part of the same cap extending outside and perpendicular to the top of X a distance of about $\frac{1}{2}$ inch. Both Y and Z are about $\frac{1}{4}$ inch in diameter and there are threads on the inside of Y and inside of Z.

By screwing the small tube C to the cap X at Y, screwing the cap X to the upper end of the large tube A, pouring the sterilizing substance E into the large tube, and inserting the thermometer and screwing it into place at Z, we find the lower end of the thermometer is immersed in the sterilizing material thereby forcing the sterilizing material farther up the large tube A. Experiments show that by having the tube A enlarged at B, the thermometer may be removed thereby leaving the apparatus open at Z and the sterilizing substance will not leak out at Z even though the apparatus be turned upside down.

The benefits derived by the above apparatus are manifold as it keeps the thermometer continually sterilized thereby preventing the spread of disease on account of physicians forgetting or neglecting to sterilize their thermometers.

Having described the apparatus, what I claim is:

A clinical-thermometer case composed of two straight tubular cylinders, one within and shorter than the other, each screw-threaded at one end and secured together by an annular cap having on one side two cylindrical screw-threaded flanges of a size to fit respectively the screw-threaded ends of said cylinders, and on the other side a cylindrical flange to receive and hold a thermometer when inserted in the case, the outer cylinder being closed at its lower end to hold a sterilizing liquid and the inner cylinder being open at both ends and forming an annular chamber between the two cylinders sufficiently large to contain the liquid in the lower end of the outer cylinder thus preventing any escape of the liquid when the thermometer is removed and the case is laid on its side or turned bottom side up.

In testimony whereof GEORGE SAMARRA has hereunto set his hand and seal this 4th day of August, A. D. 1915.

GEORGE SAMARRA. [L. S.]

Witnesses:
H. E. RUTHERFORD,
EMERSON HAZLETT.

Copies of this patent may be obtained for five cents each, by addressing the "Commissioner of Patents. Washington, D. C."